(12) United States Patent
Schulz

(10) Patent No.: US 6,261,218 B1
(45) Date of Patent: Jul. 17, 2001

(54) PROCESS AND APPARATUS FOR MAKING LOW MOLECULAR WEIGHT CELLULOSE ETHERS

(75) Inventor: Gary J. Schulz, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/203,324

(22) Filed: Dec. 1, 1998

(51) Int. Cl.$^7$ .................. C08B 11/00; C08B 11/20; C08B 11/193; C08B 11/08; C08B 11/02
(52) U.S. Cl. ...................... 538/84; 536/88; 536/90; 536/91; 536/95; 536/96; 536/99; 536/100
(58) Field of Search ................. 536/84, 88, 90, 536/91, 95, 96, 99, 100

(56) References Cited

U.S. PATENT DOCUMENTS

| | | | |
|---|---|---|---|
| 3,391,135 | 7/1968 | Ouno et al. .................. 260/214 |
| 4,015,067 | * 3/1977 | Liu et al. ..................... 536/97 |
| 4,091,205 | * 5/1978 | Onda et al. .................. 536/85 |
| 4,100,094 | * 7/1978 | Burns et al. ................. 536/99 |
| 4,357,467 | * 11/1982 | Sachetto et al. ............. 536/56 |
| 4,728,731 | 3/1988 | Raehse et al. ............... 536/96 |
| 4,762,591 | * 8/1988 | Samuelson .................. 162/237 |
| 5,476,668 | 12/1995 | Kobayashi et al. ........... 424/494 |
| 5,840,882 | * 11/1998 | Doenges et al. .............. 536/91 |
| 5,921,479 | * 7/1999 | Doenges et al. .............. 241/18 |

FOREIGN PATENT DOCUMENTS 06220102 8/1994 (JP).
08301901 11/1996 (JP).

* cited by examiner

Primary Examiner—Gary Geist
Assistant Examiner—Everett White

(57) ABSTRACT

There is a process for making a cellulose ether. The process comprises the following: a) alkalyzing a cellulose pulp; b) etherifying the alkalyzed cellulose pulp to form a cellulose ether; c) washing the cellulose ether; d) drying the cellulose ether; e) milling the cellulose ether to a particulate form; f) heating the particulate cellulose ether; g) tumbling the particulate cellulose ether while simultaneously contacting it with an acid to partially depolymerize it to a lower molecular weight; h) partially or substantially neutralizing the acid. There is also an apparatus for making the cellulose ether.

13 Claims, 1 Drawing Sheet

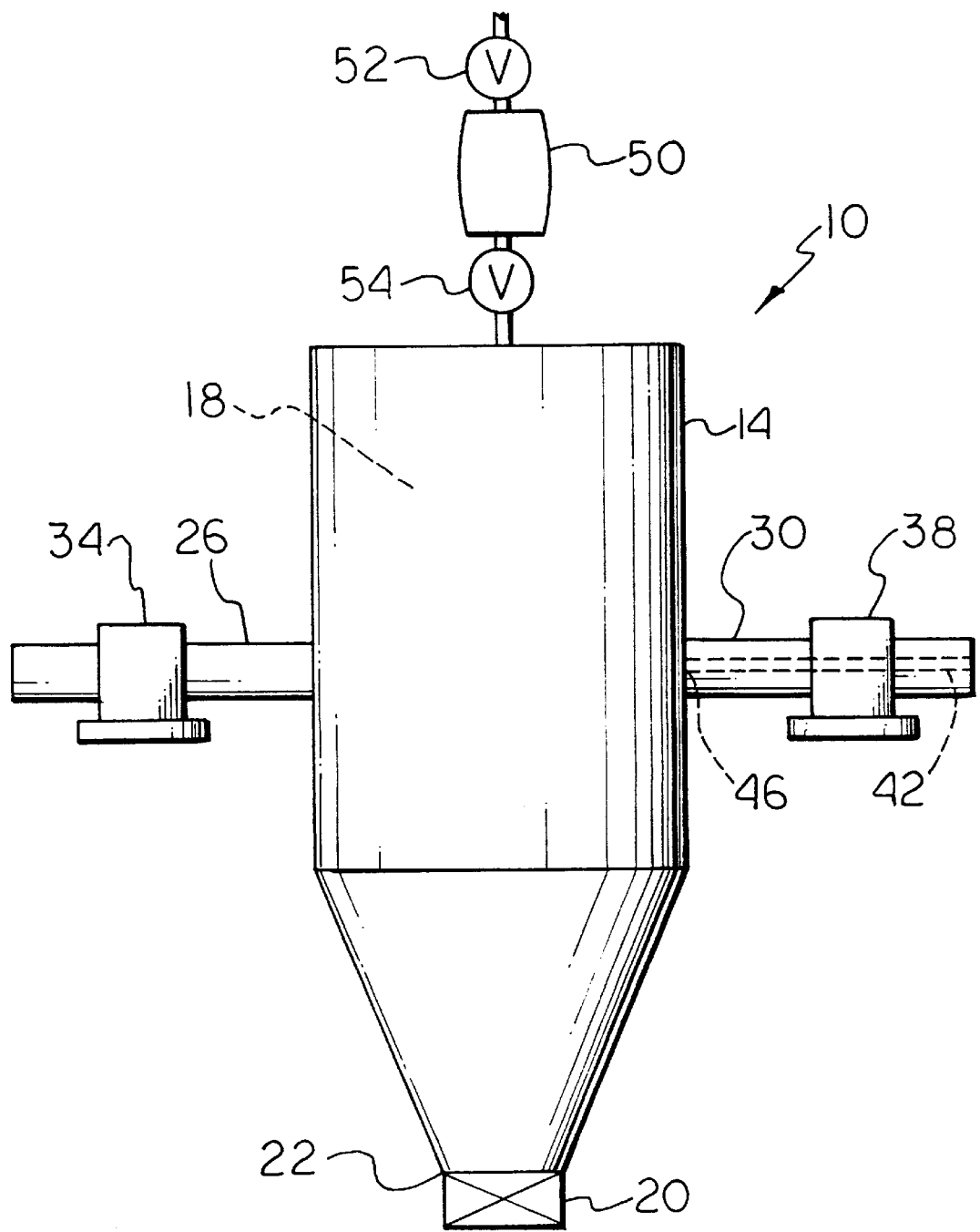

PROCESS AND APPARATUS FOR MAKING LOW MOLECULAR WEIGHT CELLULOSE ETHERS

FIELD OF THE INVENTION

The present invention relates to a process and apparatus for making low molecular weight cellulose ethers having diminished presence of carbonacious tars.

BACKGROUND OF THE INVENTION

Color contamination can occur in the manufacture of low molecular weight cellulose ethers. The contamination takes the form of carbonacious tars which are brown or black in color. The tars take the form of dark particulates in powdered cellulose ether end products. The presence of the dark particulates is problematic if the cellulose ether products are to be used in appearance-sensitive applications such as tablet coatings for pharmaceuticals. Particulate contamination in tablet coatings is unacceptable to consumers and manufacturers.

Carbonacious tars form as a result of excessive degradation during depolymerization of high molecular weight cellulose ethers to low molecular weight cellulose ethers. Depolymerization is typically effected by addition of a strong acid, i.e. hydrogen chloride, to high molecular weight cellulose ethers to cleave a fraction of the ether linkages.

Excessive degradation of cellulose ethers during depolymerization can result from the following: non-uniform moisture distribution within the cellulose ether; static cling between the cellulose ether and the internal surfaces of the depolymerization reactor; non-uniform application or adsorption of the strong acid; and catalyzation of the depolymerization reaction due to contact with catalytically active surfaces or substances.

Excessive degradation due to non-uniform moisture distribution occurs when water absorbed within the cellulose ether vaporizes and condenses on colder spots on the internal surfaces of the depolymerization reactor. Dry cellulose ether powder absorbs the condensed water and sticks to the internal surfaces. The strong acid, i.e. hydrogen chloride, is also attracted to the high moisture resulting in elevated acid content at points on the internal surfaces. The elevated acid content causes the depolymerization rate to increase severalfold compared to the bulk of the cellulose ether powder. The elevated reaction rate causes tar particulate formation at points on the internal surfaces of the depolymerization reactor.

Excessive degradation due to static cling occurs when a film of cellulose ether powder clings to stagnant regions of the internal surfaces of the depolymerization reactor. When the reactor is emptied, the powder film clings to the surfaces and is subject to overreaction from exposure to subsequent batch reactions. This overreaction can result in tar particulate formation at regions on the internal surfaces of the depolymerization reactor.

Excessive degradation can occur from the non-uniform application or absorption of the depolymerizing acid when it is introduced into the reactor in a non-gaseous form such as an aqueous liquid. The non-uniform application or absorption results in elevated acid content in portions of the cellulose ether powder. The elevated acid content causes the depolymerization rate to increase severalfold compared to the bulk of the cellulose ether powder. The elevated reaction rate can cause tar particulate formation within the cellulose ether powder.

Excessive degradation can occur from catalyzation of the depolymerization reaction by contact with catalytically active surfaces or substances. If internal surfaces of the reactor are catalytically active, the elevated reaction rate can result in tar particulate formation at those surfaces.

It would be desirable to have a process and apparatus for making low molecular weight cellulose ethers with a substantially reduced incidence of tar formation.

SUMMARY OF THE INVENTION

According to the present invention, there is a process for making a cellulose ether. The process comprises the following: a) alkalyzing a cellulose pulp; b) etherifying the alkalyzed cellulose pulp to form a cellulose ether; c) washing the cellulose ether; d) drying the cellulose ether to a reduced moisture content; e) milling the cellulose ether to a particulate form; f) adjusting the temperature of the particulate cellulose ether to about 50° C. to about 130° C.; g) continuously tumbling the particulate cellulose ether while simultaneously contacting it with an acid to partially depolymerize it to reduce molecular weight such that a two percent aqueous solution of it has a viscosity of 200 centipoise (cP) or less at 20° C.; and h) partially or substantially neutralizing the acid by contacting it with a basic compound capable of neutralizing it. The cellulose pulp preferably is alkalyzed by contacting it with sodium hydroxide. The alkalyzed cellulose pulp preferably is etherified by contacting it with methyl chloride or a mixture of methyl chloride and propylene oxide. The cellulose ether is washed preferably by contacting it with water. The cellulose ether is dried preferably by heating it. The cellulose ether is milled preferably by grinding or impacting it. Preferably, the cellulose ether is kept substantially free of contact with surfaces containing iron during depolymerization. With the present process, low molecular weight cellulose ethers which are substantially free of visible tar formation can be produced.

Further according to the present invention, there is an apparatus for making cellulose ethers. The apparatus comprises the following: a) a first reactor for alkalyzing and etherifying a cellulose pulp to form a cellulose ether; c) a washer for washing the cellulose ether; d) a dryer for drying the cellulose ether to a reduced moisture content; e) a mill for milling the cellulose ether to a particulate form; f) a second reactor which continuously tumbles the particulate cellulose ether while simultaneously contacting it with an acid and subsequently with a basic compound. Preferably, alkalyzing and etherifying are carried out in a single reactor. Preferably, the interior surfaces of the reactor in which contact between the particulate cellulose ether and the substantially anhydrous acid is occurring are substantially free of iron.

BRIEF DESCRIPTION OF THE DRAWINGS

FIG. 1 depicts a side view of a tumbling reactor useful in the process and apparatus of the present invention.

DESCRIPTION OF THE INVENTION

The present invention addresses the problem of carbonacious tar formation during the manufacture of low molecular weight cellulose ether. In its broadest aspect, the invention employs a tumbling reactor during depolymerization. The tumbling reactor relocates the contents of the reactor and in doing so helps avoid stagnant regions along the internal surfaces of the reactor and maintains a substantially uniform reaction temperature and depolymerization acid distribution within the cellulose ether mass. In another aspect of the invention, the depolymerization acid is introduced into the reactor in a substantially anhydrous, gaseous form to effect a high degree of dispersion and contact with the cellulose ether mass and to avoid the introduction of additional water. In another aspect of the invention, the internal surfaces of the depolymerization reactor are washed often enough to remove tar particulates in a relatively lower state of curing prior to their becoming insoluble in water.

The raw material used to make low molecular weight cellulose ethers is cellulose pulp. Cellulose pulp is typically obtained from wood or cotton. The pulp is preferably provided in a powder form or in granules. To make cellulose ethers for tablet coatings, it is preferable to use a cellulose pulp which is has a high intrinsic degree of whiteness.

The cellulose pulp is alkalyzed in a reactor with an alkaline hydroxide, preferably sodium hydroxide. The pulp may be alkalyzed with the alkaline hydroxide by any means known in the art such as steeping in a bath or stirred tank containing aqueous hydroxide or spraying the aqueous hydroxide directly on dry pulp. Reaction time varies according to hydroxide concentration, temperature, and retention time. The aqueous hydroxide is preferably used at an alkaline hydroxide content of about 30 to about 70 percent by weight based upon the weight of the water. Retention rates preferably range from about 5 to about 90 minutes. The temperature of alkylation preferably ranges from about 30° C. to about 60° C. Uniform swelling and alkali distribution in the pulp is controlled by mixing and agitation. The headspace of the alkylization reactor may be evacuated or partially or substantially purged with an inert gas such as nitrogen to control depolymerization of the cellulose ether product. Unreacted alkaline hydroxide may be neutralized with an acid such as hydrochloric acid, nitric acid, or acetic acid or may be neutralized with a slight excess of an etherifying agent.

The alkylated cellulose pulp is then etherified to form a high molecular weight cellulose ether. A high molecular weight cellulose ether is a cellulose ether having a molecular weight such that a two percent aqueous solution of it has a viscosity of greater than 200 cP and more typically about 4000 cP to about 100,000 cP in a 2 percent aqueous solution at 20° C.

The etherification reaction is typically carried out in a reactor under elevated pressure conditions (about 100 to about 300 pounds per square inch (about 689 to about 2070 kilopascals (kPa))) for about 0.5 to about 16 hours depending upon the reactivity of the etherifying agent. Typical etherifying agents include the lower alkyl halides and epoxides such as methyl chloride, ethyl chloride, ethylene oxide, propylene oxide, butylene oxide, and mixtures of the foregoing. For instance, methyl chloride may be used to make methylcellulose and a mixture of methyl chloride and propylene oxide may be used to make hydroxypropylmethylcellulose. The use of methyl chloride results in the by-product formation of sodium chloride (salt). Preferably, a slight excess of the etherifying agent is added to react with any unreacted alkaline hydroxide remaining from alkylation.

The etherified high molecular weight cellulose ether is washed to remove salt and other reaction by-products. Any solvent in which salt is soluble may be employed, but water is highly preferred due to its availability and environmental compatibility. The cellulose ether may be washed in the etherification reactor, but is preferably washed in a separate washer located downstream of that reactor. Before or after washing, the cellulose ether may be stripped by exposure to steam to reduce residual organic content.

The high molecular weight cellulose ether is dried to a reduced moisture content of about 0.5 to about 5.0 weight percent water and preferably about 0.8 to about 3.0 percent water based upon the weight of cellulose ether. The reduced moisture content enables the cellulose ether to be milled into particulate form and depolymerized. The cellulose ether is preferably dried at a temperature of from about 40° C. to about 80° C. Useful dryers include tray dryers, fluid bed dryers, flash dryers, agitation dryers, and tube dryers.

The dried high molecular weight cellulose ether is milled to particulates of desired size. Milling may be accomplished by any means known in the art such as a ball mill or an impact pulverizer. Typical retention times in a ball mill or impact pulverizer range from about 20 to about 120 minutes. Useful particle size ranges from about 25 to about 1000 micrometers. Preferred particle sizes are about 40 to about 250 micrometers.

It is desirable to remove any metal particulates which may have contaminated the particulate cellulose ether powder during milling. Metal particulates can be removed by magnets.

Prior to depolymerization, the cellulose ether particulates are heated to a temperature of about 50° C. to about 130° C. and preferably about 70° C. to about 110° C. The heating may be accomplished in the depolymerization reactor or by a separate heater upstream of such reactor. The moisture content of the particulates can be restored, if necessary, to a higher level prior to depolymerization by blending the particulates with water in the depolymerization reactor or a separate mixer upstream of such reactor.

The milled particulates of high molecular weight cellulose ether are depolymerized to form low molecular weight cellulose ether. A low molecular weight cellulose ether is a cellulose ether having a molecular weight such that a two percent aqueous solution of it has a viscosity of 200 cP or less at 20° C., preferably about 1 to about 100 cP at 20° C., and most preferably about 3 to about 100 cP.

The milled particulates of high molecular weight cellulose ether are depolymerized by contacting or treating them with a strong acid in a reactor which is being tumbled. Tumbling is desirable because it diminishes the incidence of stagnant internal surfaces within the reactor and only relatively simple mechanical means required to effect it. Tumbling rates preferably range from about 1 to about 60 revolutions per minute (rpm) and most preferably range from about 1 to about 10 rpm. Tumbling rate will vary according to reactor capacity and amount of cellulose ether in the reactor. The reactor can be tumbled by rotating it end over end or by rotating it axially. Tumbling end over end is preferred.

Acids useful during depolymerization include hydrogen chloride, hydrogen bromide, hydrochloric acid, and sulfuric acid. Anhydrous acids are preferred due to their lack of water content. Hydrogen chloride is the most preferred anhydrous acid.

The depolymerization acid may be added to reactor in any form such as a liquid, vapor, or gas. Addition in the form of a substantially anhydrous gas is preferred for a number of reasons: a) the high degree of dispersion and contact possible; localized concentrations of acid which could result in tar formation are avoided; b) the presence of additional water, typically present a liquid acid, is avoided in the reactor; absorption of additional water by the low molecular weight cellulose ether product and water condensation problems are avoided. Anhydrous gas can be added to the headspace of the reactor or directly into the cellulose ether powder. Addition to the headspace is preferred. The headspace of the reactor may be purged with an inert gas to prevent combustion or ignition of the powder.

The depolymerization reaction is carried out at temperatures ranging from about 50° C. to about 130° C. and most preferably at from about 70° C. to about 110° C. The temperature of the cellulose ether during reaction is preferably maintained at a substantially constant or isothermal level. The temperature of the internal surfaces of the reactor or the headspace (air) within the reactor are preferably the same as the desired temperature of the cellulose ether during reaction. The temperature of the reactor may be regulated by means of a heating/cooling jacket, an insulation blanket, or by placement in an environment which provides a regulated temperature such as an oven, a controlled-temperature chamber or room, or an insulated shroud, shield, or enclosure.

Following depolymerization, the particulate cellulose ether is contacted with a basic compound, preferably a substantially anhydrous basic compound, to partially or substantially neutralize any remaining acid. Anhydrous, powder compounds are preferred because they do not reintroduce water into the particulate cellulose ether. A preferred basic compound is anhydrous sodium bicarbonate. The basic compound can be introduced into the headspace or interior of the depolymerization reactor or into another reactor to which the depolymerized particulate cellulose ether has been transferred. The basic compound can be introduced into a reactor by any means known in the art such as by liquid injection, spraying of aerosol or vapor, blowing of powder, and the like. The preferred means of introducing the basic compound to a reactor is by blowing of dry powder with compressed or forced air or other mechanical pressure. The basic compound neutralizes any acid present in the headspace and draws out some or most acid present in the cellulose ether. The reactor is preferably tumbled as the neutralization reaction takes place. Neutralization can take place at a wide range of temperatures depending upon the chemical properties of the depolymerizing acid and the neutralizing basic compound. Typically, neutralization will be carried out at the same temperature conditions as depolymerization since it is convenient to carry out both reactions in the same reactor. The neutralization reaction between hydrogen chloride and sodium bicarbonate can be carried out at elevated depolymerization temperatures or at ambient temperature or less.

FIG. 1 shows an embodiment of the present invention in the form of a tumbling reactor 10. The tumbling reactor 10 comprises a reaction vessel 14 which defines a reaction chamber 18 therein to receive and react a cellulose ether powder (not shown) and a strong acid such as hydrogen chloride (not shown). Vessel 14 has a vessel valve 20 thereon which can be opened to reveal an opening 20 through which the cellulose ether powder can be supplied to or removed from chamber 18. Vessel 14 has shafts 26 and 30 which protrude from it and rest and revolve within bearings 34 and 38 to allow vessel 14 to be tumbled end over end. Vessel 14 can be tumbled by any means known in the art such as by hand or by mechanical means such as an electric motor (not shown) connected to shaft 26. A passageway 42 extends through the center of shaft 30 through an opening 46 within vessel 14. Passageway 42 is adapted to supply hydrogen chloride to chamber 18. Tumbling reactor 10 also has a shot chamber 50 contiguous to and adapted to be in communication with chamber 18. Shot chamber 50 is adapted to contain a substantially anhydrous basic compound such as sodium bicarbonate (not shown) capable of neutralizing the strong acid. The basic compound is shot out of shot chamber 50 into chamber 18 with compressed air or an inert gas (not shown). The basic compound is loaded into shot chamber 50 and compressed air is supplied to that chamber through a valve 52. The basic compound is shot out of shot chamber 50 into chamber 18 through valve 54. The temperature of vessel 14 may be regulated by providing a heating/cooling jacket (not shown) around it or by locating vessel 14 in an environment which provides a regulated, uniform temperature such as an oven or a controlled-temperature chamber, room, shroud, or enclosure (not shown).

Preferably, the cellulose ether does not come into contact with surfaces which contain iron during manufacture. It has been discovered that iron appears to catalyze the depolymerization reaction from high molecular weight cellulose ether to low molecular weight cellulose ether. This catalysis tends to make depolymerization rates less uniform throughout the reactor and may increase formation of carbonacious tars due to localized elevated depolymerization rates. Suitable non-ferrous metals for constructing contact surfaces of process equipment, including reactors, include titanium, nickel, and chromium. Alternately, iron-containing contact surfaces may be coated with silicones or polymers such as fluoropolymers or lined with heat-resistant plastic.

Another means of reducing tar particulate contamination in cellulose ether product is to wash the interior or contact surfaces of the depolymerization reactor on a frequent basis. Tar particulates become progressively less soluble in polar solvents such as water the more they cure or degrade. Insoluble particulates are difficult to remove via washing. Frequent washings of contact surfaces permit particulates to be removed while they are still water soluble. Preferably, the contact surfaces are washed after 20 product batches or less.

The end product low molecular weight cellulose ether is preferably substantially free of tar particulates when viewed with the unaided eye.

The present process is useful for making the following cellulose ethers: methylcellulose, ethylcellulose, hydroxyethylcellulose, hydroxyethylmethylcellulose, hydroxypropylmethylcellulose, and hydroxybutylmethylcellulose. The process is particularly useful in making methylcellulose and hydroxypropylmethylcellulose.

Low molecular weight cellulose ethers, particularly those of methylcellulose and hydroxypropylmethylcellulose, are useful in building products, food applications, and pharmaceutical applications. A particularly useful application is as a tablet coating for medicaments and drugs.

The following are examples of the present invention. Unless otherwise indicated, all percentages, parts, and proportions are by weight.

EXAMPLES

The process of the present invention was used to make a low molecular weight cellulose ether.

The process was carried out in a 1 cubic foot (28.3 liters) steel tumbling batch reactor. The reactor had a titanium liner inside it to ensure that its contents were free of contact with surfaces containing iron.

The reactor was charged with a series of ten batches of METHOCEL E4M high molecular methylcellulose. This methylcellulose has a nominal viscosity of about 4000 cP in a 2 percent aqueous solution at 20° C., a methoxyl content of 28–30 percent, and a hydroxypropyl content of 7–12 percent. Anhydrous hydrogen chloride gas was added to the reactor at 0.2 weight percent based upon the weight of the METHOCEL E4M to depolymerize it to a low molecular weight methylcellulose. The reactor was placed in an oven set at 90° C. and tumbled at a rate of 10 rpm for 40 minutes. An amount of dry sodium bicarbonate powder stoichiometric to the amount of HCl employed was added to the headspace of the reactor via blowing with compressed air. Tumbling was resumed for 5 minutes and the contents of the reactor removed.

The resulting batches of low molecular weight methylcellulose powder exhibited viscosities ranging from 2.4 to 5.0 centipoise in 2 weight percent aqueous solutions measured at 20° C. There was no visual evidence of tar particle formation in any of the batches or on the internal surfaces of the liner within the reactor. The powder was white and clean.

While embodiments of the process and apparatus of the present invention have been shown with regard to specific details, it will be appreciated that the present invention may be modified while still being fairly within the scope of the novel teachings and principles set forth herein.

What is claimed is:

1. A method of depolymerizing a high molecular weight cellulose ether powder, comprising the step of continuously tumbling the cellulose ether powder in a reactor, the reactor being rotated axially or end over end in an oven or a controlled-temperature chamber or room while simultaneously contacting the cellulose ether with a gaseous acid at a substantially isothermal level at a temperature ranging from about 50° C. to about 130° C.

2. A method according to claim 1, wherein the high molecular weight cellulose ether has a water content of at least about 0.5 weight percent.

3. A method according to claim 1, wherein the high molecular weight cellulose ether has a water content of at least about 0.8 weight percent.

4. A method according to claim 1, wherein the high molecular weight cellulose ether has a water content of no more than about 5.0 weight percent.

5. A method according to claim 1, wherein the high molecular weight cellulose ether has a water content of no more than about 3.0 weight percent.

6. A method according to claim 1, wherein the high molecular weight cellulose ether is substantially free of metal particulates.

7. A method according to claim 1, wherein the acid is selected from the group consisting of hydrogen chloride and hydrogen bromide.

8. A method according to claim 1, wherein the acid is an anhydrous acid.

9. A method according to claim 1, wherein the acid is hydrogen chloride.

10. A method according to claim 1, wherein the acid is a substantially anhydrous gas.

11. A method according to claim 1, wherein the cellulose ether is kept substantially free of contact with surfaces containing iron.

12. A method according to claim 1, wherein the reactor is tumbled at a rate of about 1 to about 60 revolutions per minute.

13. A method according to claim 1, wherein the cellulose ether powder has particle sizes of from about 25 to about 1000 micrometers.

* * * * *